Nov. 17, 1931.  A. C. GILBERT  1,832,456

ELECTRICAL MOTOR

Filed June 13, 1928

Inventor
Alfred C. Gilbert

By Rockwell my Bartholow
Attorneys

Patented Nov. 17, 1931

1,832,456

UNITED STATES PATENT OFFICE

ALFRED C. GILBERT, OF HAMDEN, CONNECTICUT, ASSIGNOR TO THE A. C. GILBERT COMPANY, OF NEW HAVEN, CONNECTICUT

ELECTRICAL MOTOR

Application filed June 13, 1928. Serial No. 284,991.

This invention relates to electrical motors, and more especially to improvements in the commutators thereof. These improvements are especially applicable to that type of commutator comprising a plurality of separated segments arranged in the form of a cylinder and used in conjunction with the armature of a small electrical motor, which is adapted for using either D. C. or A. C. current for its operation.

In order to provide an efficient motor of small size, it is desirable that the armature be provided with a comparatively large number of coils. Such a structure will require that the commutator be provided with the same number of segments as there are coils in the armature. It has been difficult in the past to construct such a commutator inexpensively, due to the required small size of these segments and the difficulty of handling and assembling the same. Motors of this type, therefore, have been comparatively expensive to construct when made to have the maximum of practical efficiency in operation.

The segments or bars of the commutators of small motors have generally been supported by end disks which are commonly made of fibre. There is a great tendency for the bars or segments of such commutators to become loose through warping of these disks or from other causes, resulting in excessive sparking, uneven wear, possible short circuits in the armature and falling apart of the commutator.

The principal object of this invention is to improve the construction of an electrical motor, whereby an increase in efficiency will be obtained while decreasing the cost of manufacturing the same.

Another object of this invention is to provide an improved commutator structure for use in an electrical motor, and which will be efficient in use and inexpensive to manufacture.

A further object of this invention is to provide in a commutator having a plurality of segments, means to secure the segments and other parts thereof together in a more efficient and permanent manner than has heretofore been possible.

A further object of this invention is to provide a construction and novel combination and arrangement of sheet metal and other stamped parts in a commutator of such form and in such arrangement that the same may be readily assembled to form a structure sufficiently sturdy to efficiently withstand the uses for which it is intended.

To these and other ends, the invention consists in the novel features and combination of parts to be hereinafter described and claimed.

Figure 1:
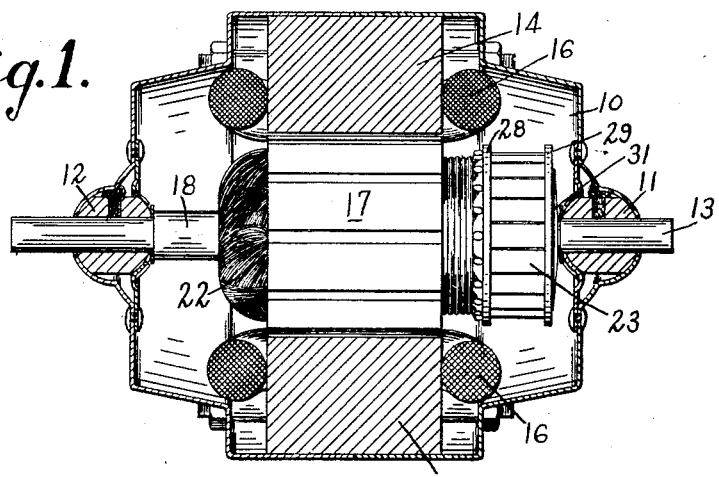
Fig. 1 is a longitudinal sectional view of an electrical motor, embodying the features of this invention.
Figure 2:
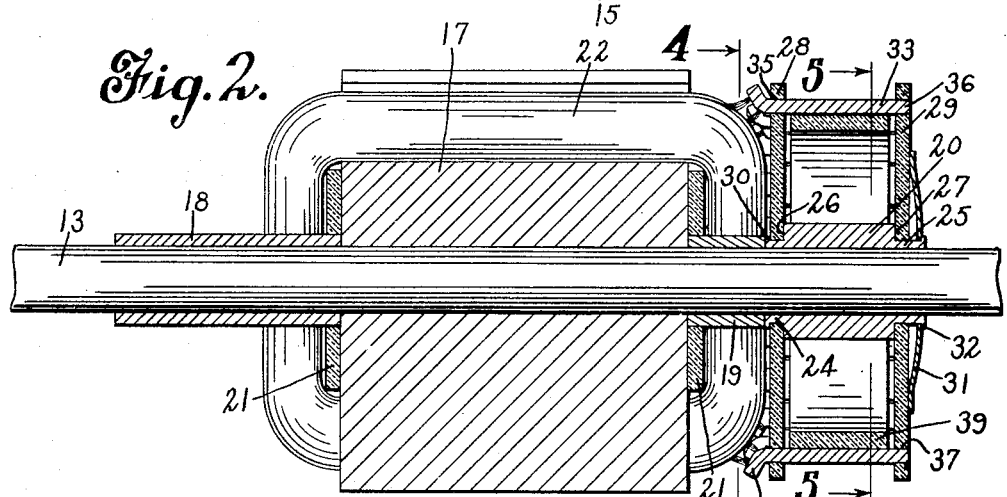
Fig. 2 is a longitudinal sectional view of the armature and commutator of the motor shown in Fig. 1.
Figure 3:
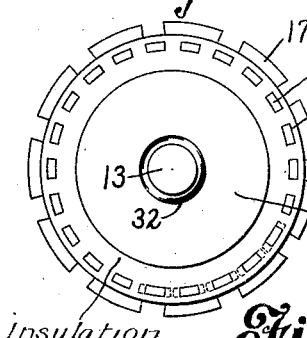
Fig. 3 is an end view of the parts shown in Fig. 2.
Figure 4:
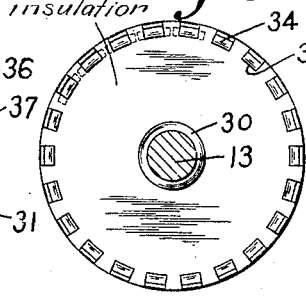
Fig. 4 is a section on lines 4—4 of Fig. 2.
Figure 5:
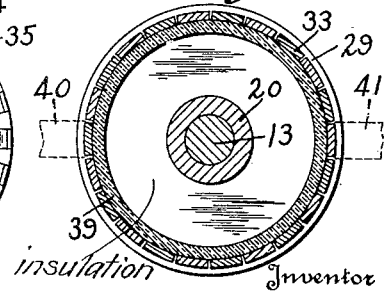
Fig. 5 is a section on lines 5—5 of Fig. 2.
Figure 6:
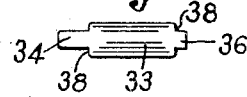
Fig. 6 is a detail top view of one of the commutator segments.

The motor selected to illustrate the features of this invention is provided with a casing 10, preferably made of sheet metal. The casing 10 is provided at each end thereof with bearing members 11 and 12, in which the armature shaft 13 is journaled and between which the same extends. Suitably secured within the casing 10 are field magnets 14 and 15, which are excited by the usual field coils 16.

An armature 17 is suitably secured upon the shaft 13, and is spaced at one end thereof from the bearing 12, by a sleeve 18. The armature at its other end is spaced from the bearing 11 by means of the short sleeve 19 and a bushing 20. Insulating washers 21 abut each end of the armature core to space the armature coils 22 therefrom.

The bushing 20 is suitably secured to shaft 13 for rotation therewith, and forms a part of and the support for a commutator 23. The bushing 20 is cylindrical in form and is provided with end portions 24 and 25, which are smaller in diameter than the intermediate portion of the bushing, whereby outwardly and oppositely directed shoulders 26 and 27 are formed at each end of the intermediate portion.

Disks 28 and 29 of insulating material, preferably hard fibre, are provided, and fit over the end portions 24 and 25, respectively, the disks being perforated for this purpose, so that they will abut against the shoulders 26 and 27, respectively. The disk 28 is retained on the end portion 24 and against the shoulder 26 by spinning or riveting over the end of portion 24, as at 30. The disk 29 is retained on the end portion 25 and against the shoulder 27 by means of a sheet metal plate 31 which is retained in operative position by riveting over the end of portion 25, as at 32.

The plate 31 fits over the reduced end portion 25, being perforated for this purpose, and a portion thereof adjacent its periphery contacts against the outer surface of an intermediate portion between the center and the periphery of the disk 29. The plate 31 is resilient and is slightly bulged outwardly at its center so that when under the pressure placed thereon, after the end of portion 25 is riveted over thereupon, the plate 31 constantly urges the disk 29, and more especially its peripheral portion, inwardly while the shoulder 27 retains the center of disk 29 against such movement. A result of such action on the part of the plate 31 and shoulder 27 is to stiffen and support the disk 29 against warping outwardly, and also for a purpose to be hereinafter described.

A plurality of commutator segments 33, preferably of stamped metal, are interposed between the disks 28 and 29. The segments 33 are spaced apart, about and adjacent the periphery of the disks in the form of a cylindrical cage concentric to the bushing 20. Each of the segments 33 is provided at one end, in this instance its inner end, with a tongue 34. The tongue 34 is adapted to be threaded through an opening 35 provided in the disk 28, to receive it. The tongue 34 may then be bent readily outward so as to be readily accessible for the purpose of soldering, or otherwise attaching, terminal wires from the armature coils thereto. Each segment 33 is also provided with a tongue 36, which in this instance is disposed at its outer end. The tongue 36 of each segment is threaded into an opening 37, provided therefor in the disk 29. The tongues 34 and 36 are preferably made narrower than the body portion of the segment so as to form outwardly and oppositely directed shoulders 38 at each end of said body portion.

The segments 33 are arranged about the disk 28 during the assembly of the commutator, after which the disk 29 is disposed in place and secured to the bushing 20 as above described. The segments 33 are, therefore, clamped between the disks 28 and 29 with the inner surface of these disks abutting against the shoulders 38.

In the embodiment illustrated, the commutator is relatively large in diameter, and therefore, it is preferable to provide the plate 31 so as to prevent the outer disk 29 from springing or warping outwardly as well as to support the same, to insure proper clamping of the segments 33 between the disks 28 and 29, and to retain the tongues 34 and 36 in the openings provided therefor in the disks. The plate 31, however, may be omitted when the diameter of the commutator is such that a riveted over portion 32 will sufficiently retain the disks 28 and 29 in clamped relation against the shoulders 38 of the segments 33.

A ring 39 of insulating material is provided in the structure of a commutator of the relative diameter as illustrated, in order to support the segments 33 against the inwardly and radially directed pressure normally applied by the brushes 40 and 41, commonly used on this type of commutator. The ring 39 is disposed within the cage-like structure formed by the assembled segments 33 during the assembly thereof, and is retained therein solely by the engagement of these segments upon its peripheral surface. Preferably the ring 39 is of a width somewhat less than the space provided between the disks 28 and 29, so as to permit dust or other foreign matter which may collect in the spaces between the segments 33, to be readily removed therefrom.

It will be readily understood, from the above description of the nature of my invention and the preferred means for carrying it out, that I have provided a commutator in which any tendency towards looseness or play between the commutator bars or segments and their supporting means is overcome and constantly taken up. The means provided for this purpose is relatively simple, however, and thus the improved commutator may be cheaply manufactured.

While I have shown and described a preferred embodiment of my invention, it is understood that it is not to be limited to all of the details shown, but is capable of modification and variation which will lie within the spirit of the invention and the scope of the appended claims.

What I claim is:

1. In an electric motor structure, a commutator comprising a pair of spaced apart disks of insulating material, a plurality of spaced apart metallic segments disposed adjacent one another and about the periphery of and between said disks, and an outwardly bulged resilient plate acting at its periphery upon one of said disks to clamp said segments between said disks.

2. In an electric motor structure, a commutator comprising a pair of spaced apart disks of insulating material mounted adjacent their centers upon a shaft engaging bushing, means between said disks and adjacent each end of said bushing to retain said disks in spaced apart relation, a plurality of spaced apart metallic segments disposed adjacent one another and about the periphery of and between said disks, and resilient means mounted on said bushing and engaging one of said disks intermediate its periphery and its center to springingly clamp said segments between said disks.

3. In an electric motor structure, a commutator comprising a pair of spaced apart disks of insulating material mounted upon a shaft engaging bushing, oppositely directed shoulders on said bushing each engaged by one of said disks to retain said disks in spaced apart relation at substantially their center portions, a plurality of spaced apart metallic segments disposed adjacent one another and about the periphery of and between said disks, and an outwardly bulged plate engaging about its periphery the outer surface of one of said disks to clamp said segments between said disks, and oppositely directed shoulders on each of said segments engaging each of said disks to retain the peripheral portion of said disks in spaced apart relation.

4. In an electric motor, a commutator comprising a shaft engaging bushing having oppositely directed axially spaced apart shoulders thereon, a pair of disks of insulating material mounted upon said bushing, each of said disks abutting one of said shoulders whereby said disks are retained in spaced apart relation at substantially their center portions, means to retain each of said disks against the corresponding shoulder and to secure it to said bushing, a plurality of segments disposed in peripherally spaced apart relation and between said disks adjacent their periphery, one of said disk retaining means being resilient and engaging one of said disks intermediate its center portion and its periphery to springingly clamp said segments between said disks.

5. A commutator for an electric motor comprising a pair of spaced apart disks, means to support said disks in axially spaced apart relation and upon a shaft, a plurality of segments disposed about and between said disks adjacent the peripheries thereof, a ring-shaped member disposed between said disks to radially support said segments, and a substantially resilient plate at one end of said commutator in operative engagement with the disk disposed thereat to clamp said segments between said disks.

6. A commutator for an electric motor comprising a pair of spaced apart disks, means to support said disks in axially spaced apart relation and upon a shaft, said disks having a series of perforations thereabout and adjacent their peripheries, a plurality of segments disposed about and between said disks adjacent the peripheries thereof, each of said segments having a tongue at each end thereof, said tongues being adapted to enter the perforations in said disks, and an outwardly bulged plate engaging one of said disks intermediate the perforations therein and its center portion to urge said disk toward the other and thereby retain the tongues of said segments in the perforations in said disk and to clamp said segments therebetween.

7. In a commutator, a pair of spaced apart disks, a bushing adapted at its ends to support said disks in spaced apart relation upon a shaft, a ring disposed between said disks radially spaced from said bushing and axially spaced from each disk, a plurality of segments radially supported by said ring and extending between said disks, and resilient means retained upon an end of said bushing and engaging one of said disks to urge it toward the other to springingly clamp said segments therebetween.

8. A commutator for an electric motor comprising a hollow bushing adapted to receive a shaft, oppositely directed shoulders adjacent each end of said bushing, a disk abutting one of said shoulders and retained thereon by a part of said bushing, a disk abutting the other shoulder, segments disposed about the periphery of and between said disks, each of said segments having oppositely directed shoulders adjacent each of its ends, said disks abutting opposed shoulders of said segments, and a resilient plate mounted upon said bushing to retain said disks in abutting relation against the shoulders on said segments, and one of said disks adjacent a shoulder on said bushing.

9. A commutator for an electric motor, comprising a hollow bushing adapted to receive a shaft, oppositely directed shoulders adjacent each end of said bushing, a disk abutting one of said shoulders and retained thereon by a part of said bushing, a disk abutting the other shoulder, segments disposed about the periphery of and between said disks, each of said segments having oppositely directed shoulders adjacent each of its ends, said disks abutting opposed shoulders of said segments, a ring-shaped member disposed between said disks and having its periphery in engagement with said segments to support them and being spaced from and about the periphery of said bushing, and means to retain said disks in abutting relation against the shoulders on said segments, and one of said disks adjacent a shoulder on said bushing, said means comprising an outwardly bulged resilient plate with its periphery engaging one of said disks intermediate is center and periphery to urge it toward the other plate.

In witness whereof, I have hereunto set my hand this 9th day of June, 1928.

ALFRED C. GILBERT.